US010807461B2

(12) United States Patent
Batsch et al.

(10) Patent No.: US 10,807,461 B2
(45) Date of Patent: Oct. 20, 2020

(54) FOUR-LINK INDEPENDENT SUSPENSION

(71) Applicant: Hendrickson USA, L.L.C., Itasca, IL (US)

(72) Inventors: Christopher J. Batsch, Naperville, IL (US); Jacob J. Larsen, Villa Park, IL (US); Alex M. Quirini, Gurnee, IL (US); Christopher E. Cantagallo, Chicago, IL (US); Jason N. Gies, Crest Hill, IL (US)

(73) Assignee: HENDRICKSON, USA L.L.C., Itasca, IL (US)

( * ) Notice: Subject to any disclaimer, the term of this patent is extended or adjusted under 35 U.S.C. 154(b) by 0 days.

(21) Appl. No.: 15/206,713

(22) Filed: Jul. 11, 2016

(65) Prior Publication Data
US 2017/0015189 A1    Jan. 19, 2017

Related U.S. Application Data

(60) Provisional application No. 62/191,901, filed on Jul. 13, 2015.

(51) Int. Cl.
*B60K 7/00* (2006.01)
*B60G 3/20* (2006.01)
(Continued)

(52) U.S. Cl.
CPC .............. *B60K 7/0007* (2013.01); *B60G 3/20* (2013.01); *B60G 3/207* (2013.01); *B60G 7/001* (2013.01);
(Continued)

(58) Field of Classification Search
CPC ...... B60K 7/0007; B60K 7/0015; B60G 3/20; B60G 3/207; B60G 3/202; B60G 7/001; B60G 2300/08; B60G 2204/182
See application file for complete search history.

(56) References Cited

U.S. PATENT DOCUMENTS 2,998,980 A * 9/1961 Ulinski .................. B60G 3/207
                                                          280/124.113
4,444,415 A   4/1984 von der Ohe
(Continued)

FOREIGN PATENT DOCUMENTS

| EP | 1785288    | 5/2007 |
| JP | 2004090793 | 3/2004 |
| WO | 2012/092003 | 7/2012 |

OTHER PUBLICATIONS

International Searching Authority, International Search Report and Written Opinion dated Oct. 6, 2016, issued in connection with International Application No. PCT/US2016/041660, filed on Jul. 8, 2016, 12 pages.

*Primary Examiner* — Frank B Vanaman
(74) *Attorney, Agent, or Firm* — McDonnell Boehnen Hulbert & Berghof LLP

(57) ABSTRACT

An independent wheel suspension having an upper suspension having an extending first arm, a lower suspension arm having an end pivotally attached to the first arm and a second end adapted for attachment to a spring, a wheel motor having a wheel motor mount positioned between the upper suspension member and the lower suspension arm, a first wheel motor linkage arm having a first end pivotally attached to the first arm of the upper suspension member and a second end pivotally attached to the wheel motor mount, a second wheel motor linkage arm having a first end pivotally attached to the lower suspension arm and a second end attached to the wheel motor mount, wherein the upper suspension member includes a spring mount adapted for attachment to a spring.

23 Claims, 7 Drawing Sheets

(51) Int. Cl.
*B60G 7/00* (2006.01)
*B60G 11/14* (2006.01)
*B60G 11/27* (2006.01)

(52) U.S. Cl.
CPC .............. *B60G 11/14* (2013.01); *B60G 11/27* (2013.01); *B60K 7/0015* (2013.01); *B60G 2200/132* (2013.01); *B60G 2200/18* (2013.01); *B60G 2202/12* (2013.01); *B60G 2202/152* (2013.01); *B60G 2204/182* (2013.01); *B60G 2204/30* (2013.01); *B60G 2300/08* (2013.01); *B60G 2300/50* (2013.01)

(56) References Cited

U.S. PATENT DOCUMENTS

| | | | | |
|---|---|---|---|---|
| 4,657,271 | A | * | 4/1987 | Salmon .................... B62D 9/02 |
| | | | | 280/124.139 |
| 5,918,692 | A | | 7/1999 | Sekita et al. |
| 6,036,201 | A | * | 3/2000 | Pond ........................ B60G 3/20 |
| | | | | 280/5.514 |
| 6,095,563 | A | | 8/2000 | Bushek |
| 6,357,766 | B1 | * | 3/2002 | Hall ......................... B60G 9/02 |
| | | | | 280/124.128 |
| 2002/0190492 | A1 | | 12/2002 | Strong |
| 2007/0199748 | A1 | | 8/2007 | Ross, VII et al. |
| 2008/0083580 | A1 | * | 4/2008 | White ..................... F16H 39/42 |
| | | | | 180/308 |
| 2009/0133944 | A1 | * | 5/2009 | Nishioka ................. B60G 3/20 |
| | | | | 180/65.51 |
| 2016/0075200 | A1 | * | 3/2016 | Hansen ................ B60K 7/0007 |
| | | | | 180/55 |

\* cited by examiner

FOUR-LINK INDEPENDENT SUSPENSION

This application claims priority to U.S. Provisional Application No. 62/191,901 entitled "Four-Link Independent Suspension" filed on Jul. 13, 2015, herein incorporated by reference in its entirety.

BACKGROUND

The present embodiments generally relate to an independent suspension for agricultural vehicles. More particularly, the present invention relates to a four-link independent suspension system useful for agricultural vehicles such as agricultural sprayers.

Agricultural vehicles are often equipped with independent wheels wherein an axle is not used to connect the front wheels, or the back wheels. Having four independent wheels without axle attachment allows the vehicle cab to ride high above the crops, and eliminates injuries to the crops or the vehicle if an axle were to brush over the crops.

However, with such an axle-less design each of the wheels may have an independent suspension. As an agricultural vehicle such as a sprayer moves over the terrain of a crop field, the wheels are subjected to longitudinal, vertical, and horizontal force inputs. Some current agricultural vehicles having four independent wheels use a two-link suspension with a spring, and some use a suspension having a dual slide arrangement. Two-link suspensions with a single swing arm are highly torque reactive.

It would be desirable to provide an independent wheel suspension useful on an agricultural vehicle that is less torque reactive than two-link single swing arm designs and yet still fits within the existing wheel housing envelope and wheels of agricultural vehicles having independent wheel suspensions.

SUMMARY

In one aspect, an independent wheel suspension is provided that includes four-link members pivotally attached at four joints. The use of a four-link system having four joints allows for the wheel motor torque to be reacted through the mechanism and not the primary suspension spring. This results in less ride height change caused by wheel motor torque (less torque reactive). Advantageously, the four-link independent wheel suspension is still able to fit within the wheel envelope used on existing agricultural vehicles such as crop sprayers.

In another aspect, an independent wheel suspension for use in an agricultural vehicle is provided including an upper suspension member having an upper end adapted for attachment to a vehicle frame, the upper suspension member having a first arm extending from a first side of the upper suspension member, a lower suspension arm having a first end pivotally attached to the first arm of the upper suspension member, the lower suspension arm having a second end adapted for attachment to a bottom of a spring, a wheel motor having a wheel motor mount, the wheel motor and wheel motor mount positioned between the upper suspension member and the lower suspension arm, a first wheel motor linkage arm having a first end pivotally attached to the first arm of the upper suspension member and a second end pivotally attached to the wheel motor mount, a second wheel motor linkage arm having a first end pivotally attached to the lower suspension arm and a second end attached to the wheel motor mount, wherein the upper suspension member includes a spring mount positioned on a second side of the upper suspension member, the spring mount adapted for attachment to a top of a spring.

BRIEF DESCRIPTION OF THE DRAWINGS

Example embodiments of the invention are described herein with reference to the drawings, wherein like parts are designated by like reference numerals.

DETAILED DESCRIPTION OF THE INVENTION

The present embodiments are directed to an independent wheel suspension that includes four link members pivotally attached at four joints. The use of a four-link system having four joints allows wheel motor torque to be reacted through the mechanism and not the primary suspension spring. This results in less ride height change caused by wheel motor torque (less torque reactive). Advantageously, the four-link independent wheel suspension is still able to fit within the wheel envelope or internal area defined by a cylindrical wall of a wheel rim used on existing agricultural vehicles such as crop sprayers that may have tires 75 inches in diameter or a different diameter. It is expected that a four-link independent wheel suspension described herein will fit within the wheel envelope of future agricultural vehicles as well.

Figure 1:
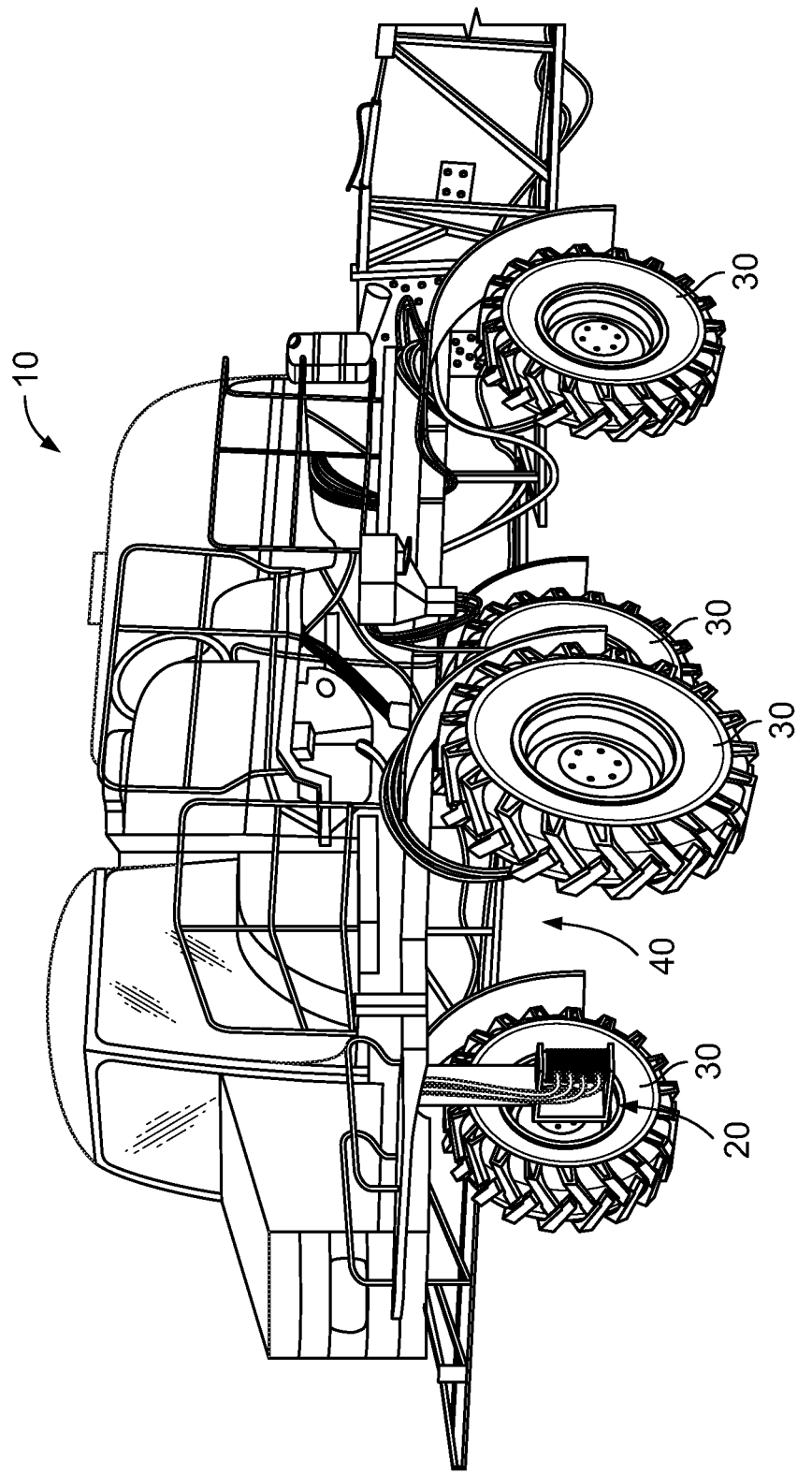
FIG. 1 is a front perspective view of an example agricultural crop spraying vehicle 10 having four wheels each with an independent wheel suspension assembly 20 and no wheel axles extending laterally from the center of oppositely disposed wheels.

FIG. 1 is a front perspective view of the agricultural crop spraying vehicle 10 (or more simply "crop spraying vehicle" or "crop sprayer") having four wheels 30 each with an independent wheel suspension assembly 20. In agricultural vehicles such as crop spraying vehicle 10, each wheel is independent of the others and a drive motor is positioned on the inside of each wheel 30 to drive the wheels, and the vehicle has 4-wheel drive. As can be seen in FIG. 1, there are no axles extending laterally between the centers of front wheels or the rear wheels. The absence of axles provides for greater clearance in the area 40 beneath the vehicle body and between the wheels to prevent or at least reduce damage to crops or the vehicle when crop sprayer 10 is moving over crops as it sprays them. Each wheel may include its own independent wheel suspension 20. Due to the nature of FIG. 1, the independent wheel suspension 20 can only be seen in FIG. 1 for a right front wheel. Independent wheel suspension 20 may be configured as the four-link independent wheel suspension 200 shown in FIGS. 3A-F or the four-link independent wheel suspension 300 shown in FIG. 4, described below.

Figure 2A:
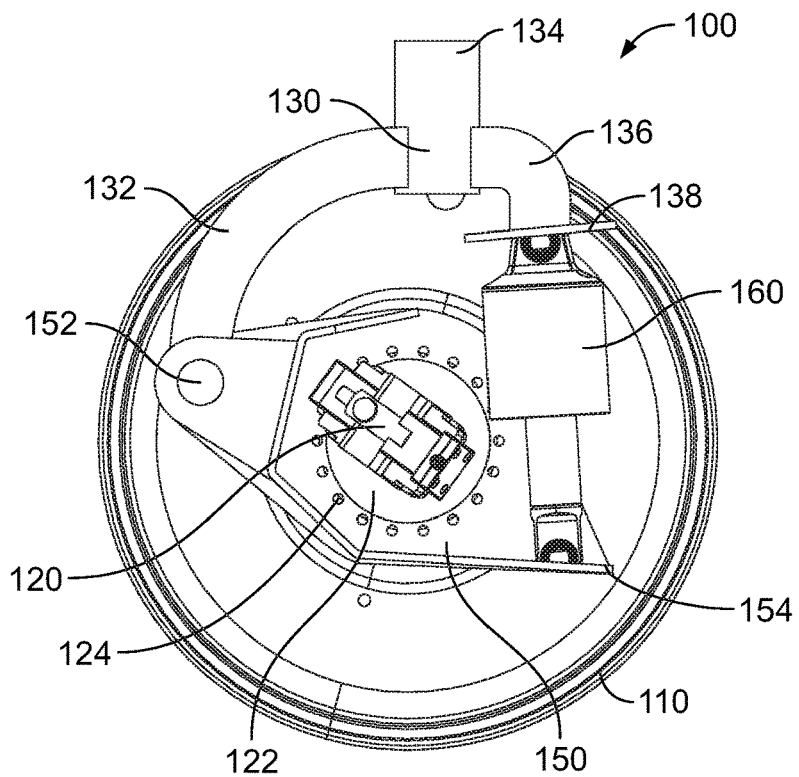
FIG. 2A is a side view of a prior two-link independent wheel suspension 100 shown in an unloaded state.

FIG. 2A is a side view of a prior two-link independent wheel suspension 100 shown in an unloaded stroke state. Thus, FIG. 2A shows suspension 100 in a fully unloaded state, as if the vehicle were picked up off the ground and the suspension 100 was just hanging. The wheel has been left out of FIGS. 2A-C for clarity. FIG. 2A is an example of a two-link system that includes an upper suspension member 130 have an upper end 134 adapted for attachment to a vehicle frame. A downwardly extending arm 132 is attached to or extends from the upper suspension member 130, although arm 132 is not required to downwardly extend. A lower suspension arm 150 is pivotally mounted to arm 132 at pivot point or joint 152. A bushing or pin may be used to provide the joint 152. A wheel motor 120 is mounted to wheel motor mount 122 which is attached at outer periphery 124 to the lower suspension arm 150. A second arm 136 downwardly extends from upper suspension member 130 with a spring mount 138 positioned on an end thereof. Similarly, lower suspension arm 150 includes a spring mount 154 at an end thereof, and a spring 160 is positioned between spring mount 138 and spring mount 154. Spring 160 may take the form of a damper, shock absorber, air spring, air bag, coil spring, or combination thereof. Independent wheel suspension 100 is positioned on an inside of the wheel 110. In FIG. 2A, the independent wheel suspension 100 is shown in an unloaded state and the spring 160 is shown in an uncompressed state.

Figure 2B:
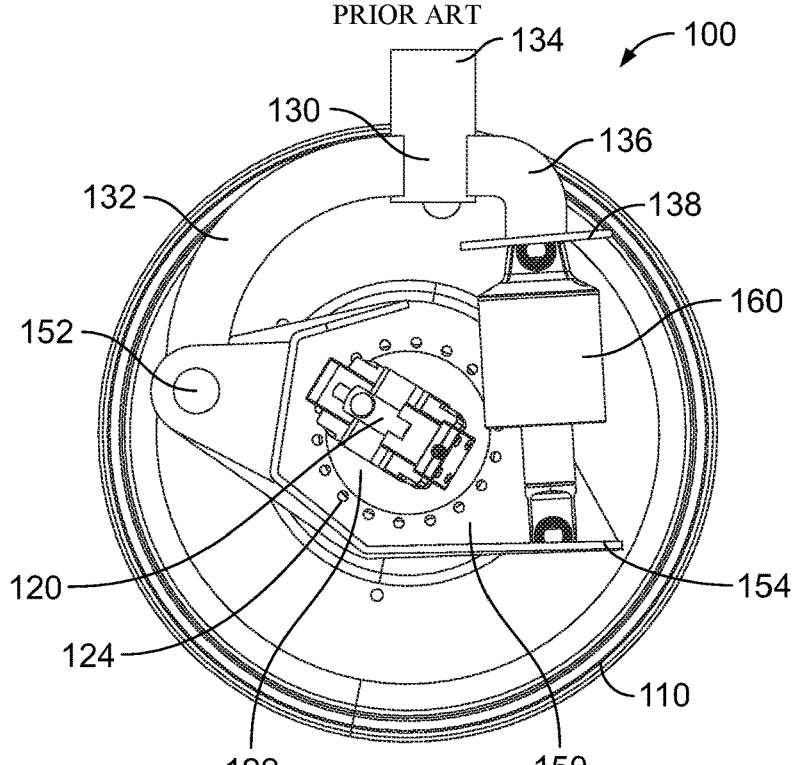
FIG. 2B is a side view of prior two-link independent wheel suspension 100 of FIG. 2A, shown in a partially loaded state.

FIG. 2B is a side view of the two-link independent wheel suspension 100 of FIG. 2A shown at mid-stroke. FIG. 2B shows suspension 100 at the static ride height position, the position the suspension naturally rests at when loaded to design weight, sitting on level ground, under no external forces being applied other than gravity.

In FIG. 2B, the lower suspension arm 150 has pivoted about pivot point or joint 152 causing spring 160 to compress and causing the wheel motor 120 to move upwardly in an arc-shaped path about pivot point or joint 152.

Figure 2C:
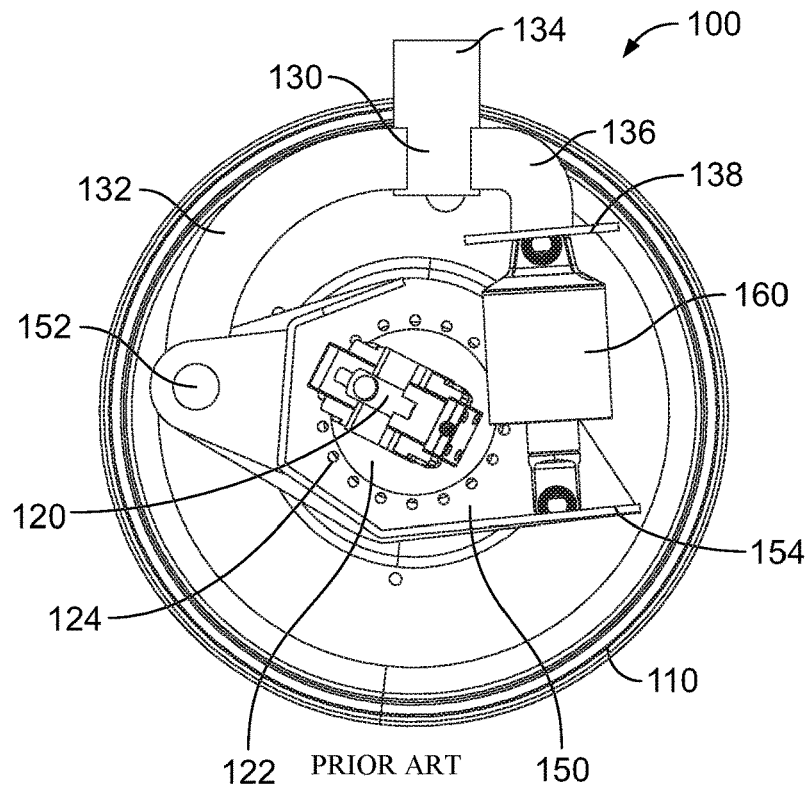
FIG. 2C is a side view of prior two-link independent wheel suspension 100 of FIGS. 2A and 2B, shown in a loaded state.

FIG. 2C is a side view of the two-link independent wheel suspension 100 of FIGS. 2A and 2B, after it has moved to a full stroke state. In FIG. 2C, the lower suspension arm 150 has further pivoted about pivot point or joint 152 allowing spring 160 to further compress and causing the wheel motor 120 to move further upwardly along an arc-shaped path about pivot point or joint 152. Thus, FIG. 2C shows a maximum load state. The spring 160 has been fully compressed by an external force. This would normally be from a dynamic event like hitting a bump at high speed while driving. The two-link independent wheel suspension 100 is highly torque reactive causing the suspension to displace when motor torque is applied. This reduces the amount of suspension travel available for a dynamic event like hitting a high speed bump and thus reducing suspension performance.

The present embodiments shown in FIGS. 3A-F and 4, advantageously employ a four-link independent wheel suspension design that includes four pivot points or joints for the links that allow vertical movement of the wheel motor while controlling its axial rotation when the four-link independent wheel suspension moves through an unloaded state to a loaded state, such as a mid-stroke state or full jounce stroke state, and allows for less compression of spring 260 because of the multiple joints.

Figure 3A:
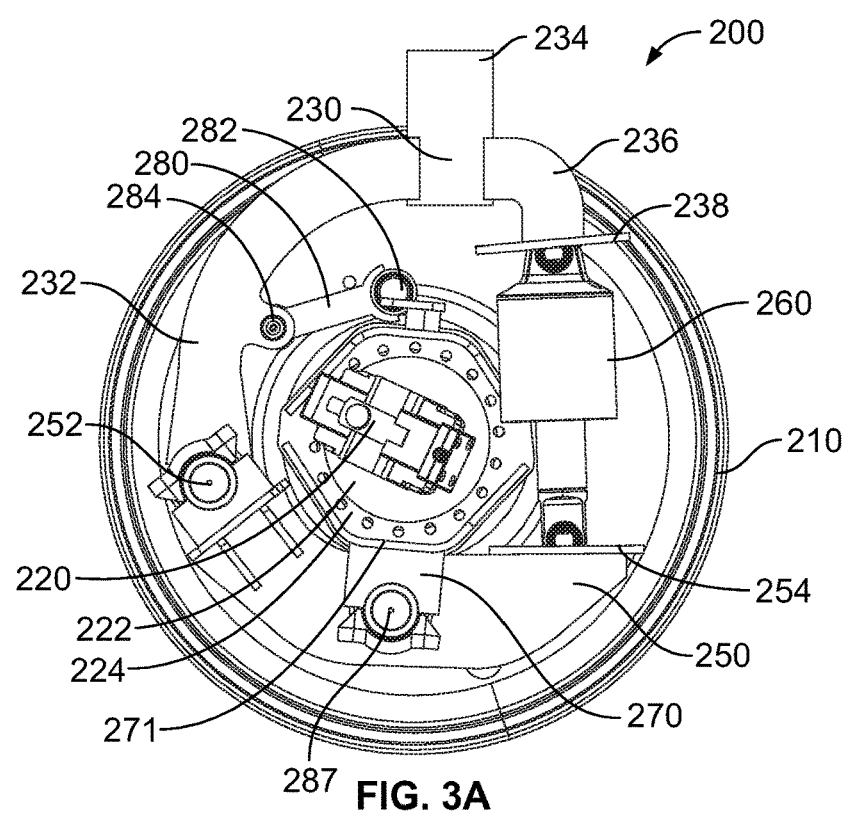
FIG. 3A is a side view of a four-link independent wheel suspension 200, according to an example embodiment, shown in an unloaded state.

In particular, FIG. 3A is a side view of four-link independent wheel suspension 200 shown in an unloaded stroke state. Four-link independent wheel suspension 200 includes an upper suspension member 230 have an upper end 234 adapted for attachment to a vehicle frame. A downwardly extending arm 232 is attached to the upper suspension member 230, although the arm 232 is not required to downwardly extend. A lower suspension arm 250 is pivotally mounted to arm 232 at pivot point or joint 252. A bushing, pin, or bearing may be used to provide the joint 252. A wheel motor 220 is mounted to wheel motor mount 222. A second arm 236 downwardly extends from upper suspension member 230 with a spring mount 238 positioned on an end thereof. Similarly, lower suspension arm 250 includes a spring mount 254 at an end thereof. Spring 260 is positioned between spring mount 238 and spring mount 254. The spring 260 may be a damper or shock absorber as shown, or it could be an air spring, air strut, hydraulic spring, rubber spring, air bag, coil spring, or other spring design, or a combination thereof.

Four-link independent wheel suspension 200 is positioned on an inside of the wheel and over brake rotor 210 which is used for an emergency brake. The tire has been left out of this Figure for clarity). Four-link independent wheel suspension 200 advantageously includes two additional links. In particular, a first wheel motor linkage member 280 has one end pivotally attached to downwardly extending arm 232 of upper suspension member 230 about pivot point or joint 284, and the other end pivotally attached to a periphery 224 of the wheel motor mount 222 about pivot point or joint 282. A second wheel motor linkage member 270 is attached to the periphery 224 of wheel motor mount 222 at one end to bracket 271 of the wheel motor mount 222, and at the other end is pivotally attached to the lower suspension arm 250 about pivot point or joint 287. As an example, the pivot point or joint 282 may be positioned within an upper portion of the periphery 224 of the wheel motor mount 222 and the second wheel motor link member is attached to a lower portion of the periphery 224 of the wheel motor mount 222. Second wheel motor linkage member 270 may be a separate member attached to the wheel motor mount 222, such as a flange, or an extension of wheel motor mount 222. In FIG. 3A, the four-link independent wheel suspension 200 is shown in an unloaded state.

Figure 3B:
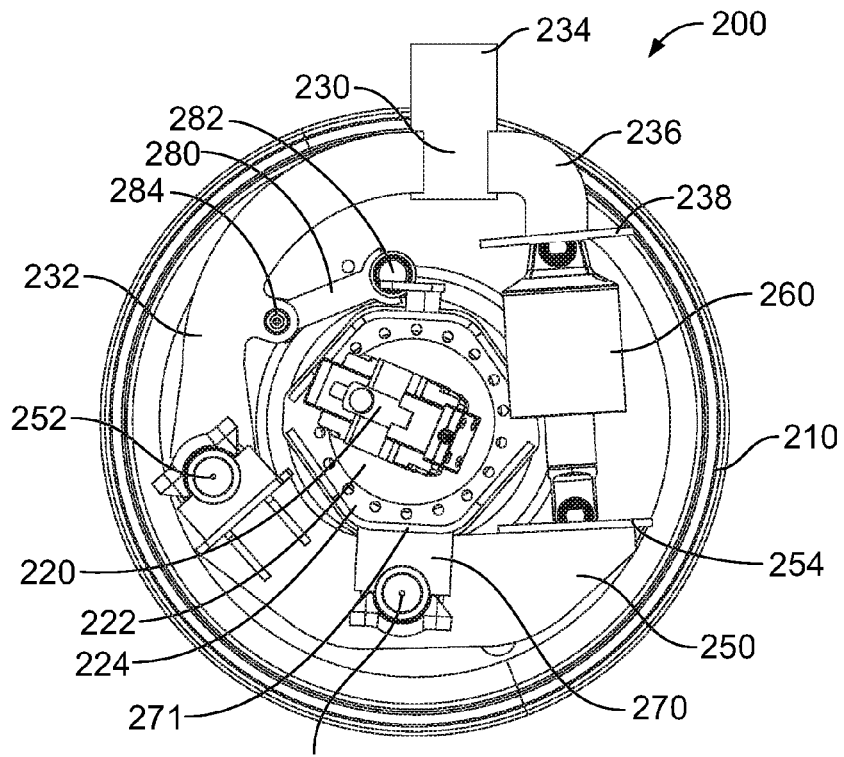
FIG. 3B is a side view of four-link independent wheel suspension 200 of FIG. 3A, shown in a partially loaded state.

FIG. 3B is a side view of the four-link independent wheel suspension 200 of FIG. 3A at an intermediate stroke position (e.g., a mid-stroke position or state). In FIG. 3B (relative to FIG. 3A), the lower suspension arm 250 has pivoted about pivot point or joint 252 such that the spring mounts 238 and 254 have traveled closer to each other. In such a case, the spring 260 installed between those spring mounts would be in a compressed state relative to the state of the spring 260 shown in the unloaded state as shown in FIG. 3A. At the same time, the first wheel motor linkage member 280 pivots about pivot point or joint 282 at one end and pivots about pivot point or joint 284 on the other end, while second wheel motor linkage 270 pivots about pivot point or joint 287. As a result of the additional links and additional pivot points 287, 282, and 284, axial rotation of wheel motor 220 is limited by the kinematics of the four bar linkage. Whereas the single swing arm design of independent wheel suspension 100 shown in FIGS. 2A-C has no such limit. This provides the four link independent wheel suspension 200 the advantage of better ride quality and more consistent ride height by limiting the amount of ride height change caused by the application of wheel torque when compared to the two link independent wheel suspension 100.

Figure 3C:
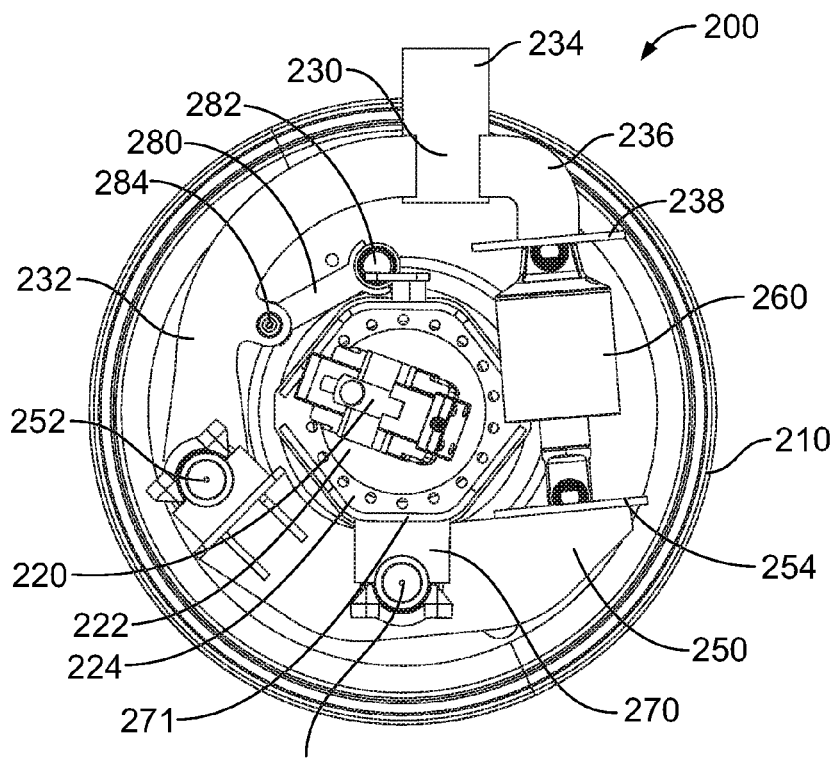
FIG. 3C is a side view of four-link independent wheel suspension 200 of FIGS. 3A and 3B, shown in a loaded state.

FIG. 3C is a side view of the four-link independent wheel suspension 200 of FIGS. 3A and 3B, after it has moved to a full stroke, or full jounce state. In FIG. 3C (relative to FIG. 3B), the lower suspension arm 250 has further pivoted about pivot point or joint 252 such that the spring mounts 238 and 254 have traveled further together to further compress spring 260. At the same time, the first wheel motor linkage member 280 further pivots about pivot point or joint 282 at one end and further pivots about pivot point or joint 284 on the other end, while second wheel motor linkage 270 further pivots about pivot point or joint 287. As a result of the additional links and additional pivot points 287, 282, and 284, the axial rotation of wheel motor 220 is limited and the torque reaction induced at wheel motor 220 is reduced compared to the single swing arm design of independent wheel suspension 100 shown in FIGS. 2A-C.

The design of suspension 200 shown in FIGS. 3A-C is a variation of a four bar linkage. The wheel motor linkage 270 attached to wheel motor mount 222 is one of the four bars. Depending on the geometry and starting positions of the bars it is possible to control the angle of this bar relative to a horizontal plane. There will be some lateral movement of the bar along with the vertical movement. If this was plotted out throughout the articulation of the suspension, it would form an arc. The design of suspension 100 shown in FIGS. 2A-C does not allow for controlling the angle of the wheel motor 120 as the suspension 100 articulates.

In suspension 100 shown in FIGS. 2A-C, when a torque is applied to the wheel motor 120 (via hydraulic, electric, or mechanical energy) it will cause a moment about pivot point 152. Unresolved, this moment will cause lower suspension arm 150 to rotate about pivot point 152. The only part of the system which can react this moment is the spring-damper element 160. Being a spring element, reacting this torque causes the spring 160 to displace. Depending on the direction of the torque on the wheel motor 120, the spring 160 will either extend or compress. In some cases with the spring extended to its unloaded state, the damper 160 resolves all of the moment created by the motor torque. Because the primary intention of the spring-damper element 160 is to control the ride-height of the vehicle, any motor torque resolved by the spring-damper element 160 will also cause a change in ride height. The change in ride height adversely affects vehicle performance by causing an inconsistent ride height (and therefore ground clearance), an inconsistent weight distribution, as well as decreasing perceived ride quality.

Figure 3D:
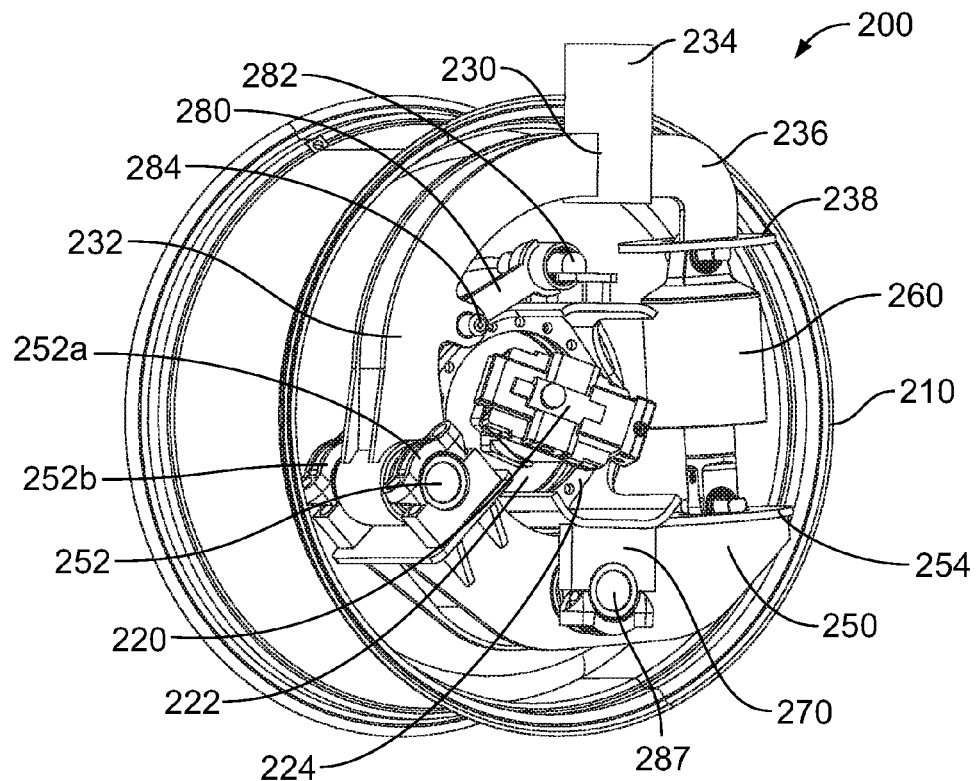
FIG. 3D is a perspective view of four-link independent wheel suspension 200 of FIGS. 3A-3C.

FIG. 3D is a perspective view of four-link independent wheel suspension 200 of FIG. 3C shown in a loaded condition at full-jounce. Four-link independent wheel suspension 200 includes an upper suspension member 230 have an upper end 234 adapted for attachment to a vehicle frame. A downwardly extending arm 232 is attached the upper suspension member 230, although the arm 232 is not required to downwardly extend. A lower suspension arm 250 is pivotally mounted to arm 232 at pivot point or joint 252. A bushing, pin, or bearing may be used to provide the joint 252. In FIG. 3D, bushings 252a and 252b are shown extending from opposite ends of arm 232 about a pin at pivot point or joint 252. Wheel motor 220 is mounted to wheel motor mount 222. A second arm 236 downwardly extends from upper suspension member 230 with a spring mount 238 positioned on an end thereof. Similarly, lower suspension arm 250 includes a spring mount 254 at an end thereof. Spring 260 is positioned between spring mount 238 and spring mount 254. The spring 260 may be a damper or shock absorber as shown, or it could be an air spring, air strut, hydraulic spring, rubber spring, air bag, coil spring, or other spring design, or a combination thereof.

Figure 3E:
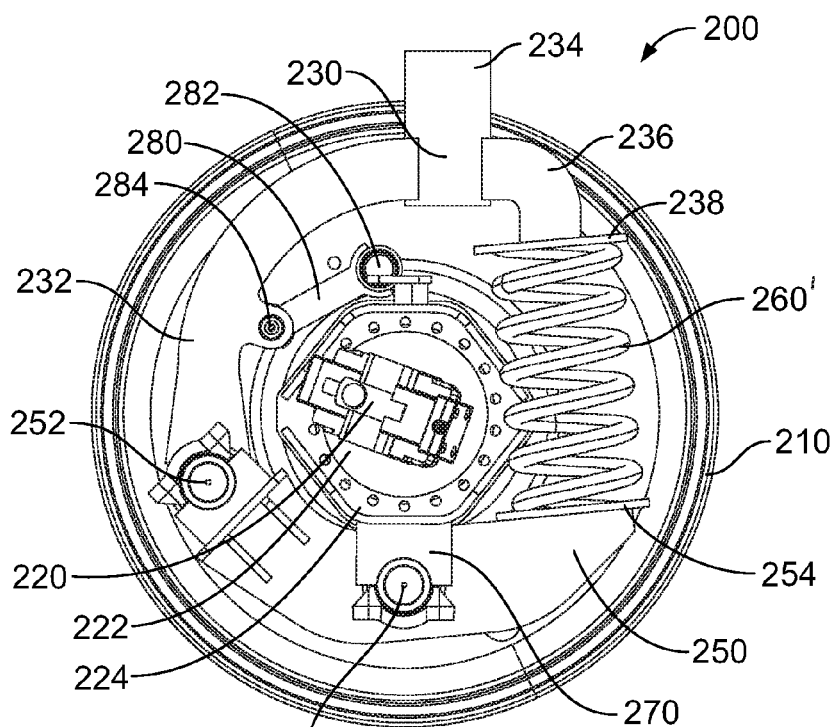
FIG. 3E is a side view of four-link independent wheel suspension 200 of FIGS. 3A-3D with an alternate spring 260'.

FIG. 3E is a side view of four-link independent wheel suspension 200 of FIGS. 3A-3D with an alternate spring 260'. As in FIGS. 3A-D, four-link independent wheel suspension 200 includes an upper suspension member 230 have an upper end 234 adapted for attachment to a vehicle frame. A downwardly extending arm 232 is attached the upper suspension member 230, although the arm 232 is not required to downwardly extend. A lower suspension arm 250 is pivotally mounted to arm 232 at pivot point or joint 252. A bushing, pin, or bearing may be used to provide the joint 252. Wheel motor 220 is mounted to wheel motor mount 222. A second arm 236 downwardly extends from upper suspension member 230 with a spring mount 238 positioned on an end thereof. Similarly, lower suspension arm 250 includes a spring mount 254 at an end thereof. Spring 260' is positioned between spring mount 238 and spring mount 254. As shown in FIG. 3E, the spring 260' is shown as a coil spring, although as noted above, the spring may be a damper or shock absorber as shown in FIGS. 3A-D, or it could be an air spring, air strut, hydraulic spring, rubber spring, air bag, or other spring design, or a combination thereof. As with suspension 200 shown in FIGS. 3A-C with spring 260' moving from an uncompressed state to a compressed state, the linkages 270, 250, 280, and 232 of suspension 200 pivot about pivot points or joints 287, 252, 284, and 282 as the suspension 200 is loaded, and spring 260' is compressed, although because of the additional linkages the spring 260' does compress as much as spring 160 does as shown in FIG. 2C.

Figure 3F:
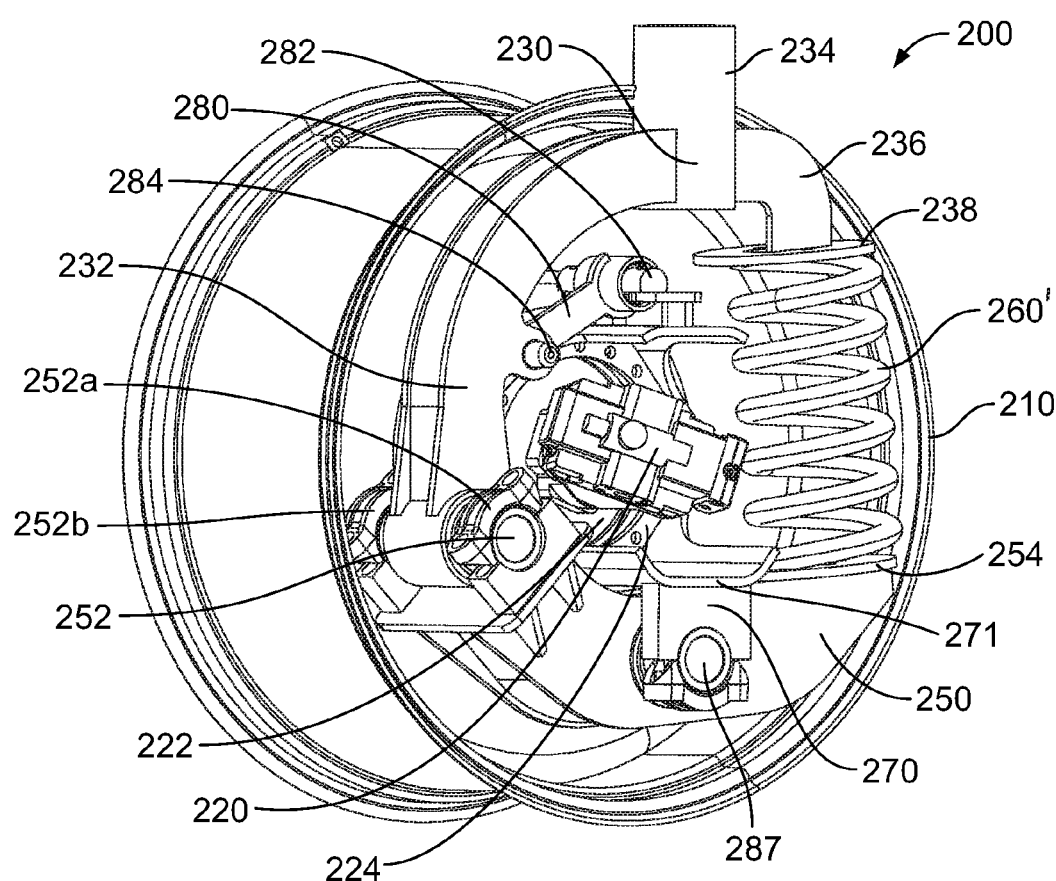
FIG. 3F is a perspective view of four-link independent wheel suspension 200 of FIG. 3E.

FIG. 3F is a perspective view of four-link independent wheel suspension 200 of FIG. 3E. Four-link independent wheel suspension 200 includes an upper suspension member 230 have an upper end 234 adapted for attachment to a vehicle frame. A downwardly extending arm 232 is attached the upper suspension member 230, although the arm 232 is not required to downwardly extend. A lower suspension arm 250 is pivotally mounted to arm 232 at pivot point or joint 252. A bushing, pin, or bearing may be used to provide the joint 252. In FIG. 3F, bushings 252a and 252b are shown extending from opposite ends of arm 232 about a pin at pivot point or joint 252. Wheel motor 220 is mounted to wheel motor mount 222. A second arm 236 downwardly extends from upper suspension member 230 with a spring mount 238 positioned on an end thereof. Similarly, lower suspension arm 250 includes a spring mount 254 at an end thereof. Spring 260' is positioned between spring mount 238 and spring mount 254. The spring 260' may also be a damper or shock absorber as shown in FIGS. 3A-D, or it could be an air spring, air strut, hydraulic spring, rubber spring, air bag, or other spring design, or a combination thereof.

Figure 4:
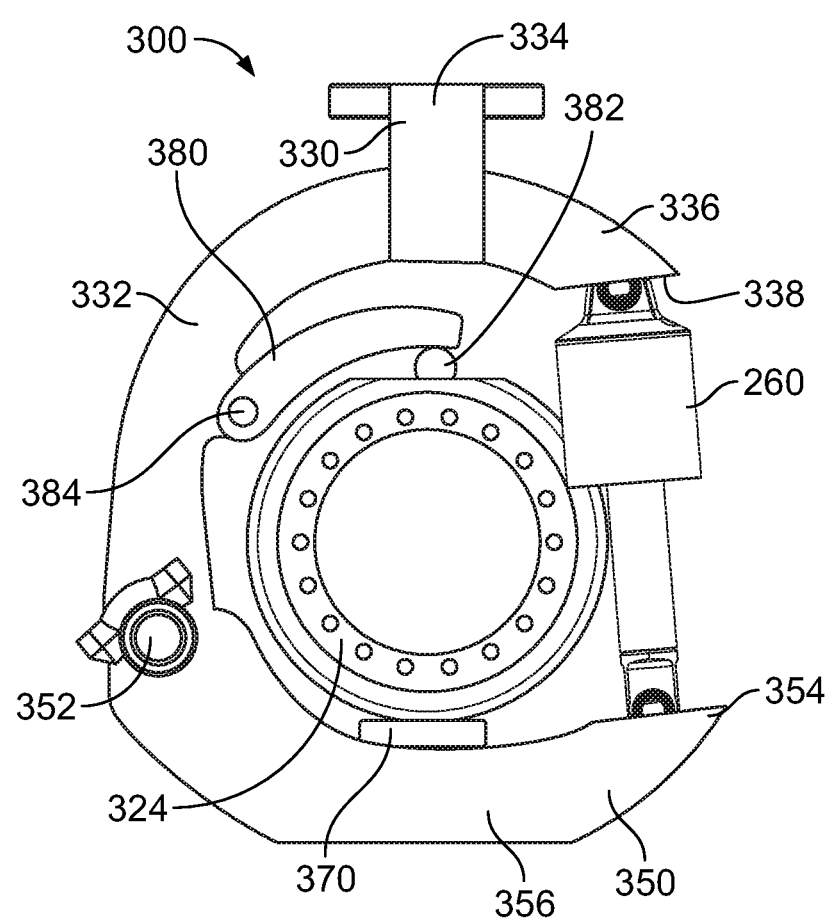
FIG. 4 is a side view of four-link independent wheel suspension 300, according to an example embodiment, shown in an unloaded state.

FIG. 4 is a side view of four-link independent wheel suspension 300 shown in an unloaded state. Four-link independent wheel suspension 300 includes an upper suspension member 330 have an upper end 334 adapted for attachment to a vehicle frame. A downwardly extending arm 332 is attached or extends from the upper suspension member 330. A lower suspension arm 350 is pivotally mounted to arm 332 at pivot point or joint 352. A bushing, pin, or bearing may be used to provide the joint 352. A wheel motor may be mounted to wheel motor mount 324. A second arm 336 downwardly extends from upper suspension member 330 with a spring mount 338 positioned on an end thereof. Similarly, lower suspension arm 350 includes a spring mount 354 at an end thereof. A spring 260 is positioned between spring mount 338 and spring mount 354 in the same manner as shown in FIGS. 3A-D. Spring 260 is shown as a damper or shock absorber. The spring may also be a coil spring such as spring 260 shown in FIGS. 3E-F, or it could be an air spring, air bag, hydraulic spring, rubber spring, or other spring design, or combination thereof.

Four-link independent wheel suspension 300 is configured for positioning between a cylindrical wall of a wheel of an agricultural vehicle such as a crop sprayer. Four-link independent wheel suspension 300 advantageously includes two additional links. In particular, a first wheel motor linkage member 380 that has a curved shape has one end pivotally attached to downwardly extending arm 332 of upper suspension member 330 about pivot point or joint 384, and the other end pivotally attached to a periphery of the wheel motor mount 324 about pivot point or joint 382. A second wheel motor linkage member 370 is attached to a periphery of wheel motor mount 324 at one end, and at the other end is pivotally attached to the lower suspension arm 350 about pivot point or joint 356. In this embodiment the second wheel motor linkage member 370 is a downwardly extending flange. The four-link independent wheel suspension 300 is shown in the static ride height stroke state.

As with four-link independent wheel suspension 200 shown in FIGS. 3A-F, as a load on the suspension 300 varies (e.g., due to variations in the terrain on which a vehicle with the suspension 300 travels), the lower suspension arm 350 pivots about pivot point or joint 352 which causes a spring 260 positioned between spring mount 338 and spring mount 354 to compress or expand. At the same time, the first wheel motor linkage member 380 pivots about pivot point or joint 282 at one end and pivots about pivot point or joint 384 on the other end, while second wheel motor linkage 370 pivots about pivot point or joint 356. As a result of the additional links and additional pivot points 356, 382, and 384, the axial rotation of wheel motor 320 is limited compared to the single swing arm design of independent wheel suspension 100 shown in FIGS. 2A-C. This provides the advantage of better ride quality and reducing the torque reactivity of four-link independent wheel suspension 300 compared to the two-link independent wheel suspension 100 shown in FIGS. 2A-C.

As noted above, the pivot points or joints may be made of pins, bushings, or bearings. In FIG. 4, the joint 352 may include a center bushing, the joints 356 and 382 may include a D-pin bar pin bushing assembly, and the joint 384 may include a spring eye bushing. Furthermore, joint 352 may have an angle of rotation of up to 30 degrees, joint 356 may have an angle of rotation of up to 13 degrees, joint 382 may have an angle of rotation of up to 25 degrees, and joint 384 may have an angle of rotation of up to 42 degrees. The angles of rotation are bi-directional, such as clockwise and counter-clockwise.

The upper suspension members and lower suspension arms shown in FIGS. 3A-F and FIG. 4 may be made by forged or cast metal, or may be made of other materials such as composite materials, and are not required to be cast or forged. First and second wheel motor linkage members may be cast, forged, cut from steel plate or tubing, and may also be made of other materials such as composite materials.

The description of FIGS. 3A-F and 4 refers to a wheel motor 220. The motor may include a hydraulic motor, an electric motor, or some other type of motor. It is also possible that a gearbox could be mounted in place of a hydraulic or electric motor, which is driven by mechanical means such as a drive shaft, chain, belt, etc. Vehicles with this type of mechanically linked drive, high ground clearance, and relatively large tire diameters are used in foundries and other industrial applications although they do not typically have a suspension.

Furthermore, in some applications, the independent suspensions disclosed herein may only be used on the front or rear wheels, or may be used on vehicles with more than four wheels, on some or all of the wheels.

The description of FIGS. 3A-F and 4 refer to use of the example suspensions on agricultural vehicles. A person having ordinary skill in the art will understand that the example suspensions or components thereof may be used on vehicles other than agricultural vehicles, such as vehicles used where a large clearance above the terrain is desired, such as a vehicle designed for off-road use to clear boulders and fallen trees, for example.

Suspensions 200 and 300 shown in FIGS. 3A-F and 4 have additional links added to the system, creating a four bar linkage. By properly orienting linkage arms 280 and 250, these bars can be used to resolve all or some of the moment resulting from motor torque. This prevents the moment from affecting the spring-damper element and causing unwanted additional displacement of the spring.

The embodiments shown in FIGS. 3A-F and 4 provide agriculture vehicles with a reduced torque reaction suspension compared to the single swing arm style suspension shown in FIGS. 2A-C using a four-link style suspension that packages within the wheel envelope. Suspensions 200 and 300 shown in FIGS. 3A-F and 4 provide an improved ride quality over existing agricultural sprayer suspension systems that create moments as a result of lateral and longitudinal wheel inputs that do not allow the suspension to move vertically freely. By having a four-link design, the vertical motion of the wheel is not hindered by lateral or longitudinal wheel inputs found in a dual slide rail independent wheel suspension. In independent wheel suspensions 200 and 300 shown in FIGS. 3A-F and 4, the torque reactivity becomes a designed controlled feature where torque reaction can be eliminated or reduced by an engineered amount based on analysis for optimum performance. The present four-link suspensions 200 and 300 shown in FIGS. 3A-F and 4 may advantageously provide for possible increased wheel travel, less longitudinal and lateral accelerations at the driver, and increased operational driving speed.

Example embodiments of the present invention have been described above. Those skilled in the art will understand that changes and modifications may be made to the described embodiments without departing from the true scope of the present invention, which is defined by the claims.

What is claimed is:

1. An independent wheel suspension for use in a vehicle comprising:
    an upper suspension member having an upper end adapted for attachment to a vehicle frame, the upper suspension member having a first arm extending from a first side of the upper suspension member, wherein the first arm has a first end and a second end positioned in a first plane extending parallel to a longitudinal axis of the vehicle;
    a lower suspension arm extending longitudinally and having a first end pivotally attached to the first arm of the upper suspension member, the lower suspension arm having a second end attached to a bottom of a spring, wherein the first end and the second end of the lower suspension arm are positioned in the first plane;

a wheel motor having a wheel motor mount, the wheel motor and wheel motor mount positioned between the upper suspension member and the lower suspension arm;

a first wheel motor linkage arm having a first end pivotally attached to the first arm of the upper suspension member and a second end pivotally attached to the wheel motor mount, wherein the first and second ends of the first wheel motor linkage arm are positioned in a second plane extending parallel to the longitudinal axis of the vehicle, where the second plane is parallel to or coplanar with the first plane;

a second wheel motor linkage arm having a first end attached to the lower suspension arm and a second end attached to the wheel motor mount, wherein the first and second ends of the second wheel motor linkage arm are positioned in a third plane extending parallel to the longitudinal axis of the vehicle, where the third plane is parallel to or coplanar with the first and second planes;

wherein the upper suspension member includes a spring mount positioned on a second side of the upper suspension member, the spring mount attached to a top of the spring.

2. The independent wheel suspension of claim 1, wherein the second wheel motor linkage arm is an extension of the wheel motor mount.

3. The independent wheel suspension of claim 1, wherein the second end of the first wheel motor linkage arm is pivotally attached to a top of the wheel motor mount.

4. The independent wheel suspension of claim 3, wherein the second end of the second wheel motor linkage arm is attached to a bottom of the wheel motor mount.

5. The independent wheel suspension of claim 1, wherein the upper suspension member comprises a cast metal.

6. The independent wheel suspension of claim 1, wherein the wheel motor mount is attached to a wheel of the vehicle.

7. The independent wheel suspension of claim 6, wherein when a vertical force is applied to the wheel, the wheel motor mount moves generally vertically at an angle of +/−10 degrees from vertical.

8. The independent wheel suspension of claim 1, wherein the spring mount of the upper suspension member is positioned at an end of a second arm extending from the second side of the upper suspension member.

9. The independent wheel suspension of claim 1, wherein the spring is attached to the spring mount of the upper suspension member and is attached to the second end of the lower suspension arm.

10. The independent wheel suspension of claim 9, wherein the spring comprises a coil spring.

11. The independent wheel suspension of claim 9, wherein the spring comprises an air spring.

12. The independent wheel suspension of claim 1, wherein the wheel motor is a hydraulic motor.

13. The independent wheel suspension of claim 1, wherein the wheel motor is an electric motor.

14. The independent wheel suspension of claim 1, wherein the second wheel motor linkage arm extends generally vertically beneath the wheel motor mount.

15. The independent wheel suspension of claim 1, wherein the first wheel motor linkage arm is pivotally attached to the wheel motor mount at one end and pivotally attached to the first arm of the upper suspension member at an opposite end at an angle of 10-15 degrees.

16. The independent wheel suspension of claim 1, wherein the first wheel motor linkage arm is curved.

17. The independent wheel suspension of claim 1, wherein the second end of the first wheel motor linkage arm is pivotally attached to a top portion of the wheel motor mount.

18. The independent wheel suspension of claim 1, wherein the upper suspension member is attached to the vehicle frame.

19. The independent wheel suspension of claim 1, wherein the independent wheel suspension comprises a four-link independent vehicle suspension having:

a first joint at a pivot point between the first arm of the upper suspension member and the first end of the lower suspension arm;

a second joint at a pivot point between the lower suspension arm and the first end of the second wheel motor linkage arm;

a third joint at a pivot point between the second end of the first wheel motor linkage arm and the wheel motor mount; and a fourth joint at a pivot point between the first end of the first wheel motor linkage arm and the first arm of the upper suspension member.

20. The independent wheel suspension of claim 19, wherein the first joint has an angle of rotation of up to 30 degrees, wherein the second joint has an angle of rotation of up to 13 degrees, wherein the third joint has an angle of rotation of up to 25 degrees, and wherein the fourth joint has an angle of rotation of up to 42 degrees.

21. The independent wheel suspension of claim 19, wherein the first joint has an angle of rotation of 30 degrees, wherein the second joint has an angle of rotation of 13 degrees, wherein the third joint has an angle of rotation of 25 degrees, and wherein the fourth joint has an angle of rotation of 42 degrees.

22. The independent wheel suspension of claim 1, wherein the second wheel motor linkage arm comprises a flange extending from the wheel motor mount.

23. The independent wheel suspension of claim 1, wherein the first, second, and third planes are coplanar.

* * * * *